United States Patent
Groell

(10) Patent No.: US 6,984,999 B2
(45) Date of Patent: Jan. 10, 2006

(54) PROBE SYSTEM AND METHOD FOR OPERATING A PROBE SYSTEM

(75) Inventor: Klaus Groell, Waging (DE)

(73) Assignee: Dr. Johannes Heidenhain GmbH, Traunreut (DE)

(*) Notice: Subject to any disclaimer, the term of this patent is extended or adjusted under 35 U.S.C. 154(b) by 0 days.

(21) Appl. No.: 11/042,765

(22) Filed: Jan. 24, 2005

(65) Prior Publication Data

US 2005/0168213 A1 Aug. 4, 2005

(30) Foreign Application Priority Data

Jan. 23, 2004 (DE) .................... 10 2004 003 487

(51) Int. Cl.
*G01R 31/02* (2006.01)
(52) U.S. Cl. .................... 324/754; 324/158.1
(58) Field of Classification Search .................... None
See application file for complete search history.

(56) References Cited

U.S. PATENT DOCUMENTS 3,956,697 A * 5/1976 Nery .................... 324/133
5,836,981 A 11/1998 Chang et al.
6,526,670 B1 3/2003 Carli
6,664,782 B2 * 12/2003 Slates .................... 324/207.16

FOREIGN PATENT DOCUMENTS

| EP | 1 179 173 | 2/2002 |
| EP | 1 179 173 | 9/2003 |

* cited by examiner

Primary Examiner—Vinh Nguyen
Assistant Examiner—Trung Q. Nguyen
(74) Attorney, Agent, or Firm—Kenyon & Kenyon

(57) ABSTRACT

A probe system includes a transceiver unit and a probe head that is mobile with respect to the transceiver unit and has a feeler. The probe head has a circuit which includes a sensor unit, a CPU, a transmitting stage and a direct-voltage source. In response to a deflection of the feeler, the sensor unit triggers an electrical signal which is converted in the transmitting stage into an electromagnetic signal. The circuit is configured such that, between the direct-voltage source and the transmitting stage, a voltage transformer is connected by which a voltage is able to be generated which is greater than the output voltage of the direct-voltage source and is applied to the transmitting stage. A method is for operating a probe system.

12 Claims, 4 Drawing Sheets

PROBE SYSTEM AND METHOD FOR OPERATING A PROBE SYSTEM

CROSS-REFERENCE TO RELATED APPLICATIONS

The present application claims priority to Application No. 10 2004 003 487.7, filed in the Federal Republic of Germany on Jan. 23, 2004, which is expressly incorporated herein in its entirety by reference thereto.

FIELD OF THE INVENTION

The present invention relates to a probe system and to a method for operating a probe system.

BACKGROUND INFORMATION

Probe systems of this kind are used, for example, for sensing the positions of workpieces which are clamped into material-working machines, such as milling machines. These probe systems often have a stationary transceiver unit which is secured to a fixed element of the material-working machine, and a part that is movable or mobile relatively thereto, which is often described as a probe head that is mounted on a movable element of the material-working machine, for example, on a milling spindle. In this context, the probe head includes a feeler or probe element that is deflectable out of a rest position and that generates a switching signal in response to a deflection out of its rest position. Rest position of the probe element is understood to be a position where the probe element does not have any contact with a workpiece. In response to contact of the probe element with the workpiece, the probe element is deflected out of its rest position.

In so-called wireless probe systems, the corresponding switching signal is transmitted by the probe head as an electromagnetic signal, e.g., as an infrared signal, to the stationary transceiver unit. In the transceiver unit, the output signals of the probe system are analyzed in order to determine the occurrence of switching signals (thus a deflection of the probe element).

For its energy supply, such a probe head often has a direct-current source in the form of one or more batteries. There is a constant desire to increase the operating availability of such probe systems, which is why there is an effort to maximize the service life of the direct-current sources. For this reason, outside of the measuring-operation times, the probe head is usually in a standby state.

European Published Patent Application No. 1 179 173, for example, describes a battery-operated probe head, for which the intention is to prolong the service life of the batteries by various measures, which ultimately improves the uptime of the respective probe system because of less frequent standstill times due to exhausted batteries.

So that the availability may be increased over and above that, the service life may be increased by using high-quality, but expensive batteries, e.g., lithium batteries. However, such batteries have only a relatively limited shelf life, because due to passivation effects, these batteries no longer supply the nominal voltage after a certain time. If, after an operating time of targeted length, a probe head is equipped with such batteries which have been stored too long, it cannot be operated. Incidentally, in the following, the term battery is intended to include both a non-rechargeable battery, as well as a rechargeable battery.

SUMMARY

Example embodiments of the present invention may provide a probe system and a method for operating a probe system in which the operating availability of a probe system may be increased.

According to an example embodiment of the present invention, a probe system includes a mobile probe head having a circuit which is configured such that, connected between a direct-voltage source and a transmitting stage is a voltage transformer by which a voltage is able to be generated that is greater than the output voltage of the direct-voltage source and is applied to the transmitting stage.

The probe system may include a direct-voltage source having at least one battery.

In an example embodiment of the present invention, also below a value of the voltage of 5 V, e.g., even below 3 V at the output of the direct-voltage source, the voltage transformer generates a voltage, applied to the transmitting stage, which is high enough that it may be able to reliably operate the transmitting stage. The voltage transformer may be configured so that, even given a voltage of less than 1 V at the output of the direct-voltage source, the voltage transformer still generates a voltage, applied to the transmitting stage, which allows the transmitting stage to operate.

In an example embodiment of the present invention, given any voltage value at all between 5 V and 16 V at the output of the direct-voltage source, e.g., between 1 V and 16 V, the voltage transformer is able to generate a voltage, applied to the transmitting stage, which may be high enough that the transmitting stage may be reliably operated using this voltage.

In an example embodiment of the present invention, the voltage at the output of the voltage transformer and applied to the transmitting stage is able to be changed to a first electric potential for producing a measuring-operation mode, and to a second electric potential for producing a standby mode.

One aspect of a circuit according to an example embodiment of the present invention is that even batteries which have been stored for a long time and no longer supply their actual nominal voltage because of passivation effects, for example, may be used without difficulty for operating a probe system. In addition, after the probe head has been put into operation using such batteries, the passivation is restituted or reversed, so that after a certain break-in phase, the circuit is able to be operated with extremely high efficiency.

Moreover, the user of a probe system of this kind has the possibility of using many different battery types with different nominal voltages, which may have a positive effect on the uptime of the probe system and on the warehousing of the batteries.

A probe system of an example embodiment of the present invention may also provide that the batteries are usable for a longer time, i.e., more energy of the batteries is usable because, even after a drop in the nominal voltage of the battery, it is possible to continue operating the probe system.

Thus, according to an example embodiment of the present invention, it may be possible to increase the operating availability of a probe system, because on one hand, by better utilization of the energy potential of the direct-voltage source, downtimes because of a battery change occur only at comparatively large time intervals. Moreover, many different battery types or possibly batteries which have already been stored too long may be used, which means that it may be possible to avoid complications when changing batteries.

Ultimately, the availability of the probe systems according to an example embodiment of the present invention may thereby also be significantly increased compared to conventional systems, that is, downtimes or set-up times may be reduced.

According to an example embodiment of the present invention, a probe system includes: a transceiver unit; and a probe head movable with respect to the transceiver unit. The probe head includes a feeler and a circuit, the circuit including a sensor unit, a CPU, a transmitting stage and a direct-voltage source configured to supply energy to the sensor unit, the CPU and the transmitting stage. The sensor unit is configured to trigger an electrical signal in response to a deflection of the feeler, the transmitting stage is configured to convert the electrical signal into an electromagnetic signal, and the transceiver unit is configured to receive the electromagnetic signal. The circuit also includes a voltage transformer arranged between the direct-voltage source and the transmitting stage, and the voltage transformer is configured to generate a voltage greater than an output voltage of the direct-voltage source and to apply the voltage to the transmitting stage.

The direct-voltage source may include at least one battery.

At a value of the output voltage of the direct-voltage source below 5 V, the voltage transformer may be configured to generate the voltage applied to the transmitting stage to operate the transmitting stage.

At a value of the output voltage of the direct-voltage source below 3 V, the voltage transformer may be configured to generate the voltage applied to the transmitting stage to operate the transmitting stage.

At a value of the output voltage of the direct-voltage source between 5 V and 16 V, the voltage transformer may be configured to generate the voltage applied to the transmitting state to operate the transmitting stage.

At a value of the output voltage of the direct-voltage source between 3 V and 16 V, the voltage transformer may be configured to generate the voltage applied to the transmitting state to operate the transmitting stage.

The voltage of the voltage transformer may be settable to a first value configured to produce a measuring-operation mode and to a second value configured to produce a standby mode. The first value may be greater than the second value.

The circuit may include a voltage limiter, the voltage transformer and the voltage limiter may be connected between the direct-voltage source and the CPU, and the voltage limiter may be connected between the voltage transformer and the CPU to reduce an input voltage of the CPU.

The circuit may include a voltage limiter, voltage transformer and the voltage limiter may be connected between the direct-voltage source and the sensor unit, and the voltage limiter may be connected between the voltage transformer and the sensor unit to reduce an input voltage of the sensor unit.

The probe system may include a voltage limiter connected in series to and in front of the sensor unit, and the voltage limiter may be configured to interrupt an electrical connection between the direct-voltage source and the sensor unit to produce a standby mode.

The voltage transformer may include a boost circuit and a voltage limiter configured to protect the boost circuit from an excessively high voltage.

According to an example embodiment of the present invention, a probe system includes: a transceiver unit; and a probe head movable with respect to the transceiver unit. The probe head includes a feeler and a circuit, and the circuit includes a transmitting stage and a direct-voltage source configured to supply energy to the transmitting stage. The transmitting stage is configured to convert an electrical signal, triggered in response to a deflection of the feeler, into an electromagnetic signal, and the transceiver unit is configured to receive the electromagnetic signal. The circuit also includes a voltage transformer arranged between the direct-voltage source and the transmitting stage. The voltage transformer is configured to generate a voltage applied to the transmitting stage greater than an output voltage of the direct-voltage source, and the voltage of the voltage transformer is settable to a first value configured to produce a measuring-operation mode and to a second value configured to produce a standby mode. The first value is greater than the second value.

According to an example embodiment of the present invention, a method for operating a probe system, which includes a direct-voltage source configured to supply energy to a probe head, a sensor unit, a CPU and a transmitting stage, includes: in a measuring-operation mode and in response to a deflection of a feeler arranged on the probe head, triggering an electrical signal by the sensor unit; converting the electrical signal in the transmitting stage into an electromagnetic signal; receiving the electromagnetic signal by a transceiver unit after the converting step; generating a voltage by a voltage transformer greater than an output voltage of the direct-voltage source; and applying the voltage generated in the generating step to the transmitting stage.

The method may include, after being in the measuring-operation mode, transferring the probe system into a standby mode. The transferring step may include setting the voltage generated by the voltage transformer to a value smaller than a value of the voltage generated by the voltage transformer in the measuring-operation mode.

The method may include reducing the voltage generated by the voltage transformer by a voltage limiter to a decreased input voltage for the sensor unit.

The transferring step may include interrupting an electrical connection between the direct-voltage source and the sensor unit by a voltage limiter.

The method may include reducing an input voltage of the CPU by a voltage limiter.

The method may include reducing an input voltage of a receiving stage by a voltage limiter.

According to an example embodiment of the present invention, a method for operating a probe system, which includes a direct-voltage source configured to supply energy to a probe head and a transmitting stage, includes: in a measuring-operation mode and in response to a deflection of a feeler arranged on the probe head, triggering an electrical signal; converting the electrical signal in the transmitting stage into an electromagnetic signal; receiving the electromagnetic signal by a transceiver unit after the converting step; generating a voltage by a voltage transformer greater than an output voltage of the direct-voltage source; applying the voltage generated in the generating step to the transmitting stage; and, after being in the measuring-operation mode, transferring the probe system into a standby mode, the transferring step including setting the voltage generated by the voltage transformer to a value smaller than a value of the voltage generated by the voltage transformer in the measuring-operation mode.

Further details and aspects of the probe system according to example embodiments of the present invention are set forth below in the following description with reference to the appended Figures.

DETAILED DESCRIPTION

Figure 1:
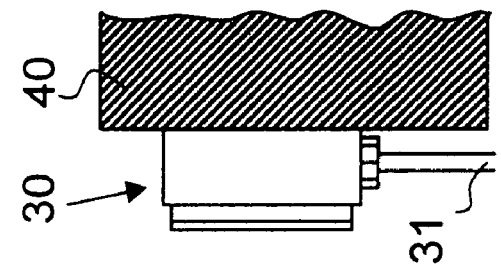
FIG. 1 is a schematic view of a probe system.
Figure 1:
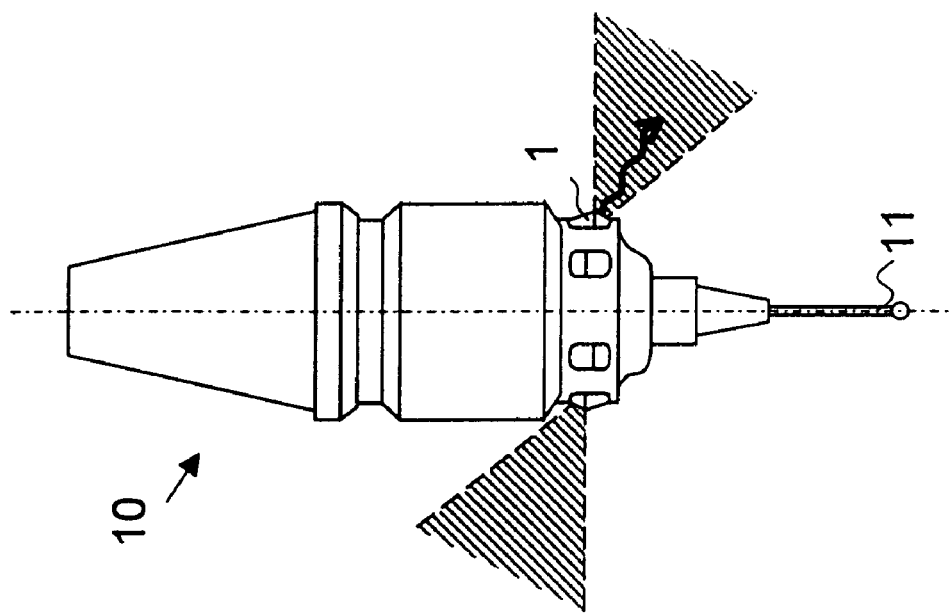

FIG. 1 illustrates a probe head 10 which may be clamped into a machine tool using a clamping cone. For measuring purposes, a cylindrical feeler 11 having a probing contact sphere at one end is provided on probe head 10.

The probe system also includes a transceiver unit 30 which is fixed in position on a stationary component 40 of the machine tool, so that probe head 10 is thus mobile with respect to transceiver unit 30, thus, is movable relative thereto.

In the exemplary embodiment illustrated, six transceiver elements 1 are distributed over the circumference of probe head 10, each secured in a manner offset by 60° along a circumferential line on probe head 10. With the aid of transceiver elements 1, electromagnetic signals, here infrared signals, may be emitted which are able to be received by transceiver unit 30. In a similar manner, a corresponding communication starting from transceiver unit 30 to transceiver elements 1 on probe head 10 is possible.

Figure 2:
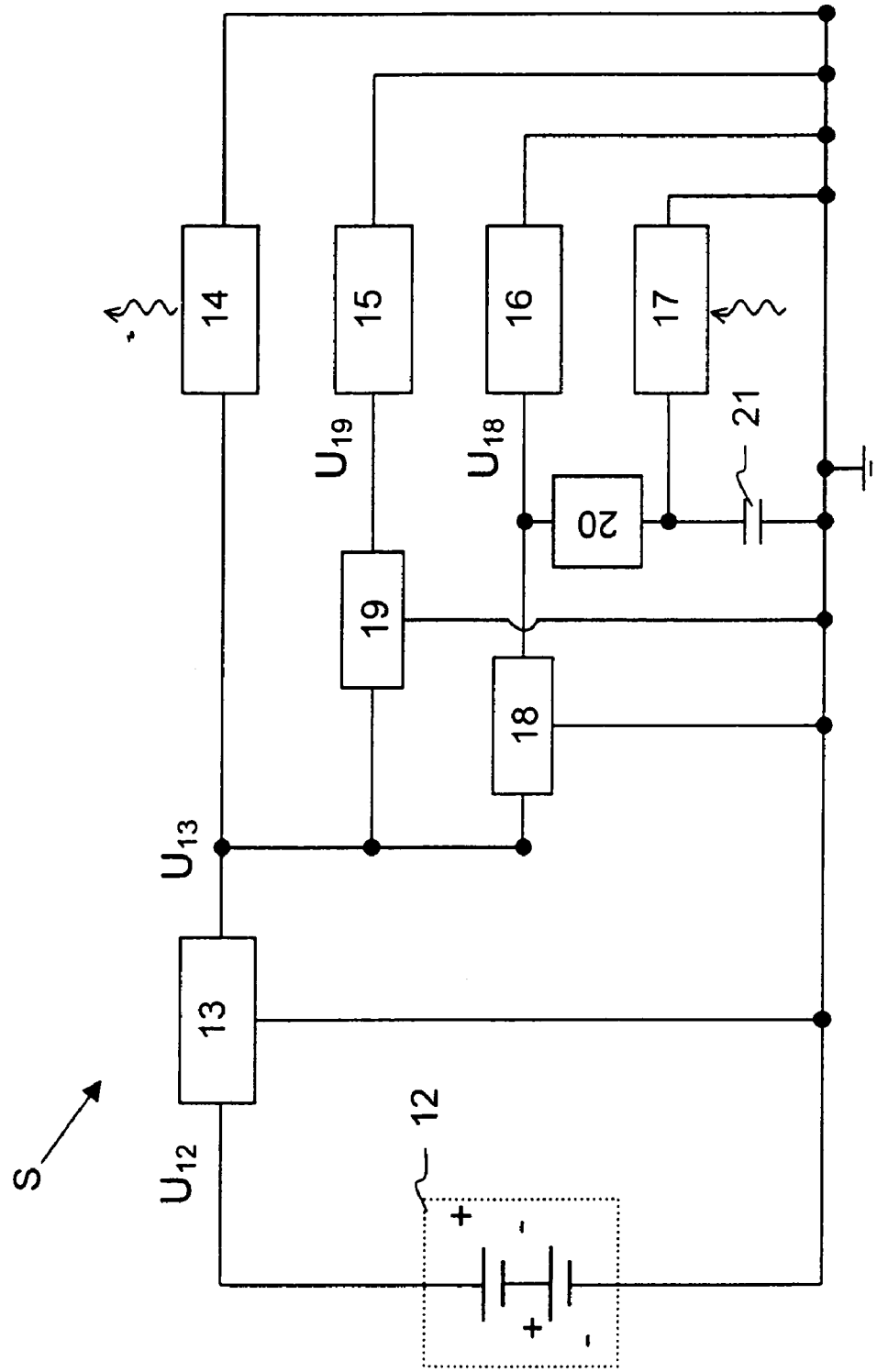
FIG. 2 is a schematic circuit diagram of an exemplary embodiment.

FIG. 2 illustrates a greatly simplified circuit diagram of a circuit S as, according to an exemplary embodiment, is arranged within probe head 10 on a printed-circuit board. Accordingly, circuit S includes a direct-voltage source 12 which, in the exemplary embodiment illustrated, includes two lithium batteries, each having a nominal voltage of 3.6 V. The lithium batteries are serially connected, so that in an ideal case, direct-voltage source 12 provides a voltage $U_{12}$ of 7.2 V. The negative pole of direct-voltage source 12 is connected to ground. Direct-voltage source 12 is used to supply energy to, inter alia, a sensor unit 15, a CPU 16, a transmitting stage 14 and a receiving stage 17. Circuit S also includes an RC filter circuit, which includes a resistor 20 and a capacitor 21.

Figure 4:
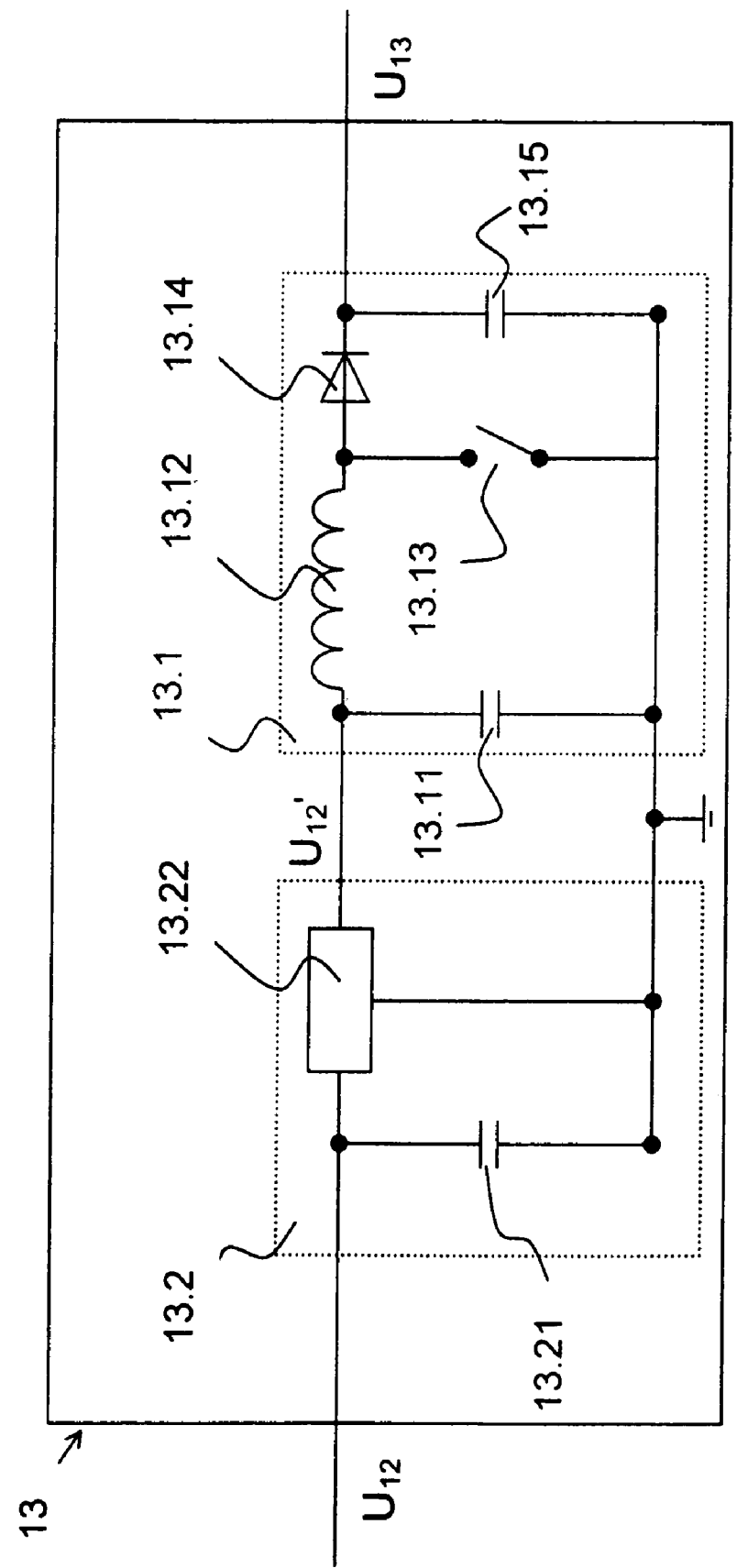
FIG. 4 is a schematic circuit diagram of a voltage transformer.

A voltage transformer 13 is connected between direct-voltage source 12 and transmitting stage 14. As illustrated in FIG. 4, voltage transformer 13 includes a so-called boost circuit 13.1 and a voltage limiter 13.2, connected in series to and in front of boost circuit 13.1, to which voltage $U_{12}$ is applied as input voltage.

On its part, boost circuit 13.1 includes a capacitor 13.11, an inductor 13.12, a switch 13.13, as well as a diode 13.14 and a further capacitor 13.15. As illustrated in FIG. 4, these components are interconnected so that, in response to suitable movement of switch 13.13, a voltage $U_{13}$ is able to be generated by boost circuit 13.1 which may be above an input voltage $U_{12'}$ at the output of voltage limiter 13.2.

To avoid damage to boost circuit 13.1 in response to excessive voltage $U_{12}$, voltage limiter 13.2, which includes a capacitor 13.21 and a voltage regulator 13.22, is connected in series to and in front of boost circuit 13.1. Thus, voltage limiter 13.2 protects boost circuit 13.1 from excessively high voltages $U_{12}$, i.e., it may be ensured that voltage $U_{12'}$ at the output of voltage limiter 13.2 may not rise above the permissible input voltage of boost circuit 13.1.

Alternatively, however, a voltage transformer 13 may also be provided which has no voltage limiter 13.2.

As illustrated in FIG. 2, circuit S also includes two further voltage limiters 18, 19 which supply output voltages $U_{18}$, $U_{19}$ that are used at the same time as input voltage for sensor unit 15 and for CPU 16, respectively. Since the electric current which flows through resistor 20 is very small, the input voltage into receiving stage 17 may be equated in good approximation with voltage $U_{18}$.

In order to transfer probe head 10 from a battery-saving standby mode to a measuring-operation mode, a corresponding activation signal (e.g., infrared signal) is dispatched by stationary transceiver unit 30. The activation signal is converted by receiving stage 17 of probe head 10 from an infrared signal to an electrical signal which is then relayed to CPU 16. Thereupon, corresponding commands are transferred from CPU 16 to the relevant components in probe head 10, so that the probe system, i.e., the probe head, is transferred into the measuring-operation mode.

If feeler 11 is deflected while in measuring-operation mode, a digital signal (e.g., change of a voltage level from high to low) is generated in sensor unit 15. This signal is transmitted to CPU 16 where it is further processed. The signal, further processed by the CPU, is then routed to transmitting stage 14, which generates the transmission signal in the form of electromagnetic rays or signals. In the exemplary embodiment illustrated, the electromagnetic signals take the form of infrared signals. However, radio signals, for example, may also be used. The signals are received by stationary transceiver unit 30. Inside transceiver unit 30, the infrared signals are converted into electrical signals and conditioned. The conditioned electrical signals arrive via a cable 31 at a stationary sequential electronics, where they are further processed.

After a certain operating time, the energy of direct-voltage source 12 becomes exhausted, and the batteries must be replaced. For example, in the case of lithium batteries, it may frequently happen that they have become passivated over the course of their storage time, and therefore no longer deliver their nominal voltage of 3.6 V each. For example, it is possible that immediately at the beginning of the re-startup of direct-voltage source 12 with the replaced passivated batteries, only a voltage $U_{12}$ of less than 5 V will be output. However, for proper operation, transmitting stage 14 may require an input voltage $U_{13}$ of more than 5 V. In the exemplary embodiment illustrated, the minimum setpoint operating voltage for transmitting stage 14 is at 5.5 V. Voltage $U_{12}$, which in this phase of the exemplary embodiment should amount to 4.5 V, is increased by voltage transformer 13 to $U_{13}$=5.5 V. Thus, the probe system is able to enter into operation using the passivated batteries as well. If, over a certain operating time of probe head 10, direct-voltage source 12 becomes loaded, the passivation effects of the lithium batteries are reversed, so that voltage $U_{12}$ rises steadily again. In the event voltage $U_{12}$ of direct-voltage source 12 rises above the set 5.5 V, this voltage is transmitted, unchanged, by voltage transformer 13, so that in this case, the value of voltage $U_{12}$ is equal to the value of voltage $U_{13}$. A voltage $U_{13}$ above 5.5 V up to the 7.6 V maximally attainable with two lithium batteries may cause no difficulties as input voltage for the operation of transmitting stage 14.

For operation of the probe system at the end of the service life of the lithium batteries, e.g., when direct-voltage source 12 supplies a voltage $U_{12}$ which is below 5.5 V, voltage transformer 13 may increase voltage $U_{12}$ of direct-voltage source 12 to voltage $U_{13}$=5.5 V (according to specification). The possible service time of the lithium batteries may thereby be increased compared to conventional probe systems. Due to the longer usability of the batteries, the operating intervals may be prolonged, and therefore the availability of the probe system may be increased.

In the operating states in which direct-voltage source 12 delivers a voltage $U_{12}$ less than 5.5 V, voltage transformer 13 thus generates a voltage $U_{13}$, applied to transmitting stage 14, which is greater than output voltage $U_{12}$ of direct-voltage source 12.

A voltage limiter 19 reduces voltage $U_{13}$=5.5 V to a voltage $U_{19}$=5 V, as may be necessary for the operation of sensor unit 15. In addition to the function of voltage reduction, voltage limiter 19 may have the capacity to smooth voltage $U_{19}$ applied to the input of sensor unit 15, which may be of considerable importance for the measuring performance of the probe system.

CPU 16 and receiving stage 17 are supplied with a voltage $U_{18}$ of 2.5 V. Therefore, a suitable voltage limiter 18, which reduces voltage $U_{13}$=5.5 V to 2.5 V, is connected in series to and in front of CPU 16 and receiving stage 17.

If, after being in the measuring-operation mode, the probe system is to be transferred into a standby mode, voltage transformer 13 is switched such that it outputs a voltage $U_{13}$ of only 3 V, so that the power loss of circuit S may be reduced, and therefore the service life of the batteries may be increased. At the same time, for the same reasons, voltage limiter 19 is switched such that it transmits no current, so that sensor unit 15 is quasi switched off. Output voltage $U_{13}$ of voltage transformer 13 is thus set to a first value (e.g., 5.5 V) for producing a measuring-operation mode, and to a second value (e.g., 3 V) for producing a standby mode, the first value accordingly being greater than the second value. In other words, after the measuring-operation mode, the probe system is transferred into a standby mode. To produce the standby mode, output voltage $U_{13}$ of voltage transformer 13 is set to a value (e.g., 3 V) which is less than the corresponding value (e.g., 5.5 V) in the measuring-operation mode.

When the batteries of direct-voltage source 12 are finally spent, two lithium batteries again, but also batteries having another nominal voltage, may be inserted into the battery compartment of probe head 10. For example, two alkali batteries having a nominal voltage of 1.5 V each may be used as direct-voltage source 12, so that a voltage $U_{12}$ of 3 V is generated. This voltage $U_{12}$ is increased by voltage transformer 13 to voltage $U_{13}$=5.5 V. However, direct-voltage source 12 may also include one or more rechargeable storage batteries, so that, for example, given two freshly charged storage batteries, voltage $U_{12}$ is 2.88 V. During the discharge process of the storage batteries, voltage $U_{12}$ becomes less, voltage $U_{13}$ nevertheless remaining substantially constant at 5.5 V due to circuit S. Only as of a value of voltage $U_{12}$ at the output of direct-voltage source 12 of less than, e.g., 0.8 V is voltage transformer 13 no longer able to supply the predefined 5.5 V, and it may become necessary to change the batteries. Thus, if a battery change is necessary, various battery types, or even already passivated batteries, may be used in the probe system. This feature may lead to an increase in availability of the probe system, because probe head 10 may be put into operation again even if the original batteries are not in stock, or the stored batteries do not supply the nominal voltage necessary for conventional systems.

For the reasons already explained, the probe system may be operated over an extremely wide range of voltage $U_{12}$ at the output of direct-voltage source 12. As of a voltage $U_{12}$ of more than 16 V, voltage limiter 13.2 of the voltage transformer may be damaged, so that in the case of the circuit illustrated, voltages $U_{12}$ at the output of direct-voltage source 12 of more than 16 V may not be permissible, that is, at such high voltages $U_{12}$, transmitting stage 14 may no longer be operated.

Therefore, in the exemplary embodiment illustrated, the probe system may be operated in the entire range of voltage $U_{12}$ at the output of direct-voltage source 12 between, e.g., 0.8 V and 16 V, voltage transformer 13 then generating a voltage $U_{13}$ (e.g., 5.5 V), applied to transmitting stage 14, which, at 5.5 V, may be high enough that it may be able to reliably operate transmitting stage 14.

Voltage transformer 13 may ensure that within the range described above, voltage $U_{13}$ is at least 5.5 V. Therefore, it may also be ensured that input voltage $U_{19}$ of sensor unit 15 is able to be reduced to the requisite 5 V by voltage limiter 19.

An analogous observation also holds true for the voltage supply of CPU 16 and of receiving stage 17. Here as well, a reduction of voltage $U_{13}$ to the requisite input voltage $U_{18}$ of 2.5 V may always be attainable by voltage limiter 18. Voltage limiter 18 may also have the capacity to smooth voltage $U_{18}$ compared to voltage $U_{13}$, which may be a significant advantage for the operation of CPU 16.

Figure 3:
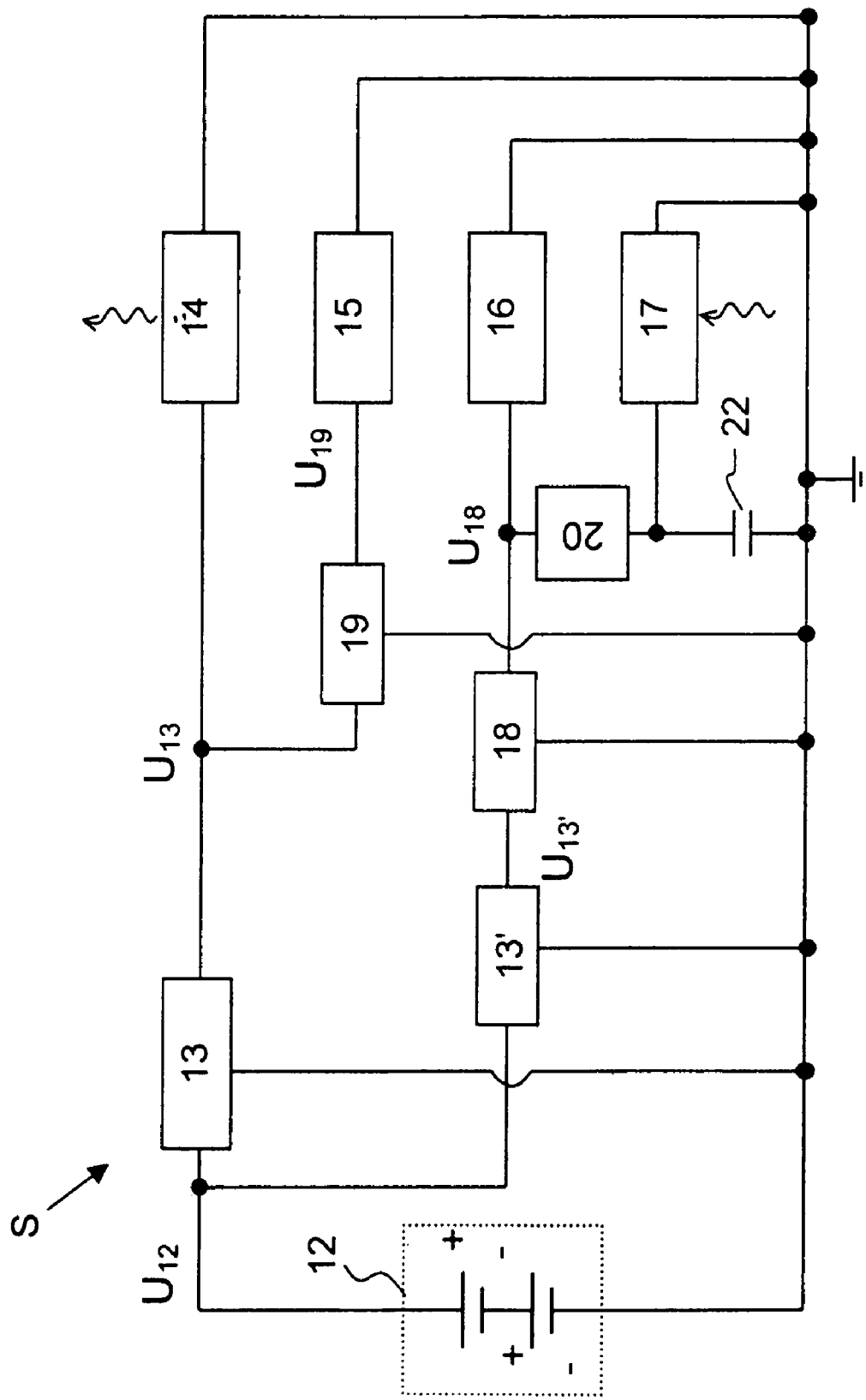
FIG. 3 is a schematic circuit diagram of an exemplary embodiment.

In an exemplary embodiment of circuit S, as illustrated in FIG. 3, voltage $U_{12}$ is applied both to voltage transformer 13 and to a further voltage transformer 13'. In principle, voltage transformer 13' is designed in a similar manner as voltage transformer 13 and also fulfills the same function, but is set to an output voltage $U_{13}'$ of, e.g., 3.3 V. If, for example, direct-voltage source 12 delivers a voltage $U_{12}$ of 2.88 V, it is increased by voltage transformer 13' to 3.3 V. If, in the course of operation, voltage $U_{12}$ drops below a value of 2.5 V, the voltage is retained at $U_{13}'$=3.3 V by voltage transformer 13'. In both cases, voltage limiter 18 reduces voltage $U_{13}$ to the required input voltage $U_{18}$ of 2.5 V. The reduction may lead to a smoothing of input voltage $U_{18}$. At the same time, the other voltage transformer 13 may ensure an increase of the voltage to $U_{13}$=5.5 V. This arrangement may be able to increase the overall efficiency of circuit S.

As an alternative to voltage transformer 13 described above, a so-called SEPIC element may also be used for the same purpose. The SEPIC element has the property that the predefined output voltage is also not changed upward, that is, if, when using an SEPIC element, an output voltage of 5.5 V is predefined, there may be no drop below this voltage if the corresponding input voltage is less than 5.5 V, but it is also not exceeded if the corresponding input voltage is greater than 5.5 V. This characteristic may be advantageous from the standpoint of reducing the power loss, i.e., for increasing the efficiency of circuit S, and therefore for improving the availability of the entire probe system.

Due to the circuit of example embodiments of the present invention, the warehousing for batteries may be simplified considerably, because on one hand, batteries which have been stored for a long time may cause no difficulties, and on the other hand, different battery types may be used.

What is claimed is:

1. A probe system, comprising:
    a transceiver unit; and
    a probe head movable with respect to the transceiver unit, the probe head including a feeler and a circuit, the circuit including a sensor unit, a CPU, a transmitting stage and a direct-voltage source configured to supply energy to the sensor unit, the CPU and the transmitting stage, the sensor unit configured to trigger an electrical signal in response to a deflection of the feeler, the transmitting stage configured to convert the electrical signal into an electromagnetic signal, the transceiver unit configured to receive the electromagnetic signal, the circuit including a voltage transformer arranged between the direct-voltage source and the transmitting stage, the voltage transformer configured to generate a voltage greater than an output voltage of the direct-voltage source and to apply the voltage to the transmitting stage.

2. The probe system according to claim 1, wherein the direct-voltage source includes at least one battery.

3. The probe system according to claim 1, wherein, at a value of the output voltage of the direct-voltage source below 5 V, the voltage transformer is configured to generate the voltage applied to the transmitting stage to operate the transmitting stage.

4. The probe system according to claim 1, wherein, at a value of the output voltage of the direct-voltage source below 3 V, the voltage transformer is configured to generate the voltage applied to the transmitting stage to operate the transmitting stage.

5. The probe system according to claim 1, wherein, at a value of the output voltage of the direct-voltage source between 5 V and 16 V, the voltage transformer is configured to generate the voltage applied to the transmitting state to operate the transmitting stage.

6. The probe system according to claim 1, wherein, at a value of the output voltage of the direct-voltage source between 3 V and 16 V, the voltage transformer is configured to generate the voltage applied to the transmitting state to operate the transmitting stage.

7. The probe system according to claim 1, wherein the voltage of the voltage transformer is settable to a first value configured to produce a measuring-operation mode and to a second value configured to produce a standby mode, the first value greater than the second value.

8. The probe system according to claim 1, wherein the circuit includes a voltage limiter, the voltage transformer and the voltage limiter connected between the direct-voltage source and the CPU, the voltage limiter connected between the voltage transformer and the CPU to reduce an input voltage of the CPU.

9. The probe system according to claim 1, wherein the circuit includes a voltage limiter, voltage transformer and the voltage limiter connected between the direct-voltage source and the sensor unit, the voltage limiter connected between the voltage transformer and the sensor unit to reduce an input voltage of the sensor unit.

10. The probe system according to claim 1, further comprising a voltage limiter connected in series to and in front of the sensor unit, the voltage limiter configured to interrupt an electrical connection between the direct-voltage source and the sensor unit to produce a standby mode.

11. The probe system according to claim 1, wherein the voltage transformer includes a boost circuit and a voltage limiter configured to protect the boost circuit from an excessively high voltage.

12. A probe system, comprising:

a transceiver unit; and a probe head movable with respect to the transceiver unit, the probe head including a feeler and a circuit, the circuit including a transmitting stage and a direct-voltage source configured to supply energy to the transmitting stage, the transmitting stage configured to convert an electrical signal, triggered in response to a deflection of the feeler, into an electromagnetic signal, the transceiver unit configured to receive the electromagnetic signal, the circuit including a voltage transformer arranged between the direct-voltage source and the transmitting stage, the voltage transformer configured to generate a voltage applied to the transmitting stage greater than an output voltage of the direct-voltage source, the voltage of the voltage transformer settable to a first value configured to produce a measuring-operation mode and to a second value configured to produce a standby mode, the first value greater than the second value.

\* \* \* \* \*